Aug. 16, 1949.  J. E. NORTH  2,479,251
CONNECTOR
Filed Oct. 15, 1947.

INVENTOR.
James E. North
BY
Charles K Woodru
Agent

Patented Aug. 16, 1949

2,479,251

UNITED STATES PATENT OFFICE 2,479,251

CONNECTOR

James E. North, Galva, Ill.

Application October 15, 1947, Serial No. 779,846

5 Claims. (Cl. 285—6.5)

This invention pertains to new and useful improvements in connectors for use in the electrical field as, for instance, those for use in connecting a piece of conduit to an outlet box.

One object of the invention is to provide a connector which makes unnecessary the threading of the conduit as is often done.

Another object of the invention is the provision of a connector which is predominantly formed of stamped or formed sheet metal pieces, and requiring for its fabrication no machining or die-threading to form the nut-receiving body threads, in consequence of which the article may be made at minimum expense and sold to users at a low price.

Still another important object and advantage of the invention is that it facilitates connection of conduit and outlet box in that in use of the device access to the inside of the box for purposes other than for insertion of a part of the connector is unnecessary, all required holding, as, for instance, against rotation, and all required tightening of the parts with respect to one another being done from outside the box.

How the above-mentioned and still other and further objects and advantages of the invention are accomplished is set forth in the detailed description which follows and shown on the drawings in which.

Figure 1:
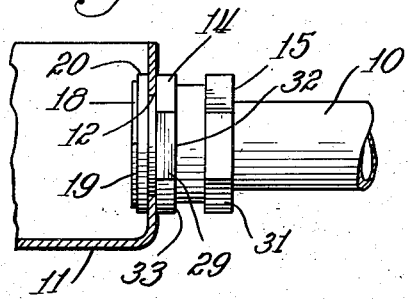
Fig. 1 is a side elevation of the device of the invention in association with a piece of conduit or the like attached to a conventional outlet box, the latter being shown in cross section.
Figure 4:
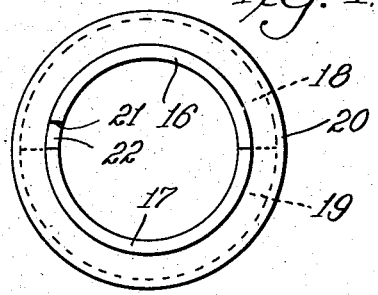
Fig. 4 is an end view of the structure of Fig. 3.
Figure 5:
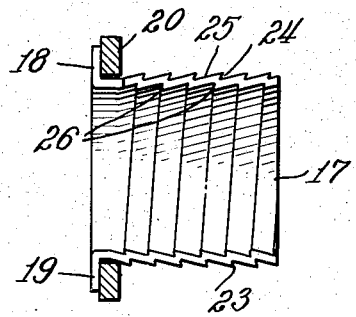
Fig. 5 is a cross-sectional view of the showing of Fig. 3 taken substantially along the line 5—5 of Fig. 3.

Referring now to Fig. 1, reference numeral 10 indicates a piece of electric wire-bearing pipelike conduit and 11 indicates a conventional outlet box having therein a suitable wire and conduit receiving opening 12. The connector is shown in fully attached and integrated condition in Fig. 1 and consists of the cylindrical structure 13 shown in Figs. 3, 4 and 5, the anti-turn washer 14 of Fig. 2 and the nut 15 of Fig. 4.

Figure 3:
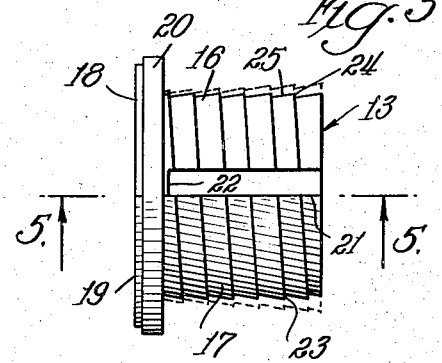
Fig. 3 is a side elevation of the bi-partite cylinder which receives the nut shown in Fig. 6.

As best shown in Fig. 3 the conduit receiving cylinder 13 may comprise two similar thin sheet metal generally semi-cylindrical portions 16, 17 each having at their rear portions out-turned flanges 18, 19 forming shoulders which abut a retaining washer 20. Washer 20 holds the semi-cylindrical portions in cylinder-forming relation but permits sufficient movement of each with respect to the other to allow them to spread apart sufficiently to internally receive the end of the conduit into the longitudinal opening between the generally semi-cylindrical portions at the ends thereof which are spaced from washer 20.

A part of the side wall of one of the cylindrical pieces (in this case shown as being generally semi-cylindrical portion 16) is cut away longitudinally thereof forming a linear slot 21 which extends to the end of cylinder 13 opposite its engagement with washer 20. It will be noted that slot 21 does not extend throughout the entire length of semi-cylindrical portion 16, a lug portion 22 being left so that the cylinder portion adjacent washer 20 is of generally annular configuration throughout so the semi-cylindrical portions may swing with respect to one another at that end confined by the washer 20 within the limits permitted by the latter for easy conduit receiving purposes as shown by the dotted lines in Fig. 3, and also so that the threads of the two semi-cylindrical portions will remain in properly aligned relation during and after application of the nut.

Semi-cylindrical portions 16, 17 are stamped out to form thereon peripheral threads 23 having relatively shallow straight shoulders 24 and relatively lengthy sloping faces 25, a factor making for easy reception of correspondingly internally threaded nut 15 and for firm frictional retention of the nut. Being formed of relatively thin metal, the interior surfaces of semi-cylindrical portions 16, 17 are readily embossed with internal threads corresponding to exterior threads 23, the sharp junctures 26 of the faces and slopes of which form continuous inwardly directed ridges which firmly engage the periphery of a conduit or the like inserted in the device in the assembled condition thereof.

Figure 2:
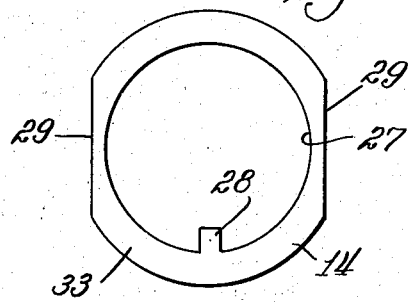
Fig. 2 is a plan view of the externally applied anti-turn washer used in the invention.

As shown in Fig. 2, the anti-turn washer 14 is provided with a generally annular central opening 27 of slightly greater cross dimension than cylindrical portion 13 at the threaded portion of the latter so that it may be freely received thereon. Opening 27 would be completely annular except for an inwardly directed lug 28 which is of smaller dimension than slot 21 (Fig. 3) and is receivable therein in attached condition of the washer. Exteriorly washer 14 is provided with parallel lateral wrench-receiving surfaces 29, 29. It will be obvious that when washer 14 is slipped over the threaded lateral surfaces of cylindrical member 13 with lug 28 inserted into slot 21 a wrench in contact with surfaces 29, 29 will effectively hold the cylindrical member from turning during application of the hereinafter more fully described nut 15 on the threaded exterior surfaces of cylindrical member 13.

Figure 6:
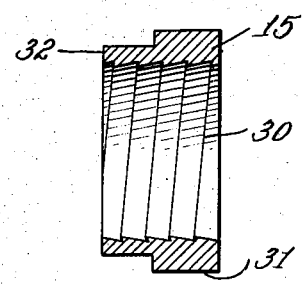
Fig. 6 is a cross-sectional view of the interiorly threaded nut receivable over the exteriorly threaded surfaces of the structure of Fig. 3.

As shown in Fig. 6, nut 15 is provided with internal threads 30 corresponding throughout to the configuration of exterior threads 23 of the structure of Fig. 3, upon which such nut is threadingly receivable. Nut 15 is exteriorly hexagonally shaped as at 31 for wrench-receiving purposes, and at its inner end is provided with a planar annular shoulder 32 which abuts antiturn washer face surface 33 in assembled condition of the device.

To use a device of the invention the structure of Fig. 3 is inserted into the box 11 and through opening 12 therein so that the inner surface of washer 20 abuts the lateral edges of the opening with the threaded portion extending outwardly through the opening. Washer 14 is then inserted over the outwardly extending threaded portion with lug 28 positioned within slot 21. The lateral washer surfaces 29, 29 are then wrench-grasped and the nut 15 slipped over the conduit 10. The end of the conduit is then inserted into the end opening between semi-cylindrical portions 16, 17 and the nut is then threaded upon the exterior threads of such portions. As previously stated, the holding of washer 14 will effectively prevent turning of the structure of Fig. 3 during the threading-on of the nut, and in being threaded on the parts, semi-cylindrical portions 16, 17 will be swung toward one another so that the internal ridges 26 will bite into the exterior surfaces of conduit 10, effectively holding it in desired position and effectively joining the conduit and the outlet box.

While I have shown and described my invention with considerable particularity I do not wish the exactness of showing and description to be taken in other than an illustrative sense, desiring to be limited only by the scope of the appended claims.

What I claim is:
1. A connector comprising oppositely disposed thin-walled semi-cylindrical portions held in generally hollow cylinder-forming relation and having nut-receiving threads on their external peripheries, a washer encompassing said semi-cylindrical portions at one end thereof and holding them in above-mentioned relation yet permitting movement of each with respect to the other to freely receive between them the end of a conduit, said washer adapted to internally abut the wall of a conduit box having an opening therein through which said semi-cylindrical portions extend in the connected condition of said connector, an internally threaded nut threadable over the exterior of said semi-cylindrical portions to hold them in conduit-retaining relation, and means associated with said semi-cylindrical portions exteriorly of the conduit box to which said connector is attached and adjacent said nut to prevent turning of said semi-cylindrical portions during attachment of said nut.

2. A connector according to claim 1 in which a longitudinally extending slot is provided between adjacent semi-cylindrical portions and the holding means comprises a washer having wrench receiving sides and an internal lug positionable in said slot.

3. A connector comprising an externally threaded thin-walled and hollow generally cylindrical portion open at both ends and one end of which is bent outwardly and away from said cylinder to form a shoulder of greater cross dimension than the opening in a conduit box through which said connector is inserted from the inside, the wall of said cylinder having at least one longitudinally extending slot therein so the cylinder may be sprung apart sufficiently to receive the end of a conduit having an external cross dimension approximating the internal cross dimension of said cylinder, and an internally threaded nut adapted for reception on the external threads of said cylinder, said nut coacting with the slotted cylinder wall to bring said cylinder into impingement with the outer surfaces of the conduit while forcing the connector into engagement with the wall of the conduit box to which it is being connected, and means for holding the connector against rotation during tightening of the nut, said means being exterior of the conduit box, remote from said shoulder and adjacent said nut.

4. A connector as set forth in claim 3 in which the means for holding the connector against rotation comprises a washer having a central opening therein of a cross dimension approximating the external cross dimension of said cylinder, the washer being receivable over said cylinder, there being an inwardly directed lug in the internal opening of said washer receivable in said slot in said cylinder, the peripheral sides of said washer being formed to receive a wrench, and in the connected condition of said connector said washer being positioned on said cylinder exteriorly of a conduit box to which said connector is being applied and behind said nut.

5. A connector comprising a two part body, the parts of which are generally semi-cylindrical, means at one end of the body-forming semi-cylindrical parts for holding said parts in such relation as to generally form a hollow cylinder, said cylinder being externally threaded and having outwardly flanged shoulder means formed at one end thereof adapted to abut the inner side of a wall of a conduit box having an opening therein approximating the diameter of said cylinder and through which said cylinder may extend in its attached condition, an internally threaded nut receivable on the exterior threads of said cylinder to cause the parts of which it is comprised to compress into impinging relation on the end of a conduit inserted into said cylinder, and means for holding said cylinder against rotation during tightening of said nut, said means being wholly independent of and positioned wholly exteriorly of the wall of the conduit box to which said connector is attached.

JAMES E. NORTH.

REFERENCES CITED

The following references are of record in the file of this patent:

UNITED STATES PATENTS

| Number | Name | Date |
|---|---|---|
| 1,131,399 | McGinley | Mar. 9, 1915 |
| 1,777,518 | Dunmire | Oct. 7, 1930 |
| 2,250,685 | Tiefenbacher et al. | July 29, 1941 |